Oct. 21, 1952     C. F. SHERWIN     2,614,331
MICROMETER
Filed July 24, 1951
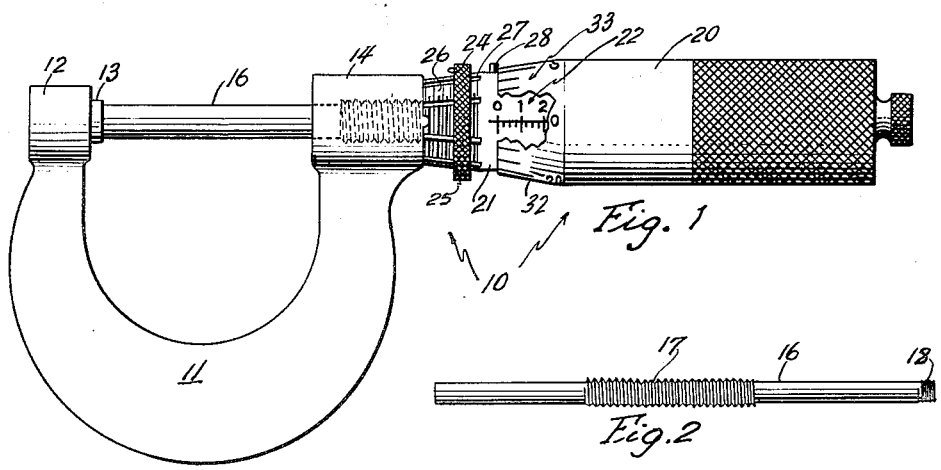
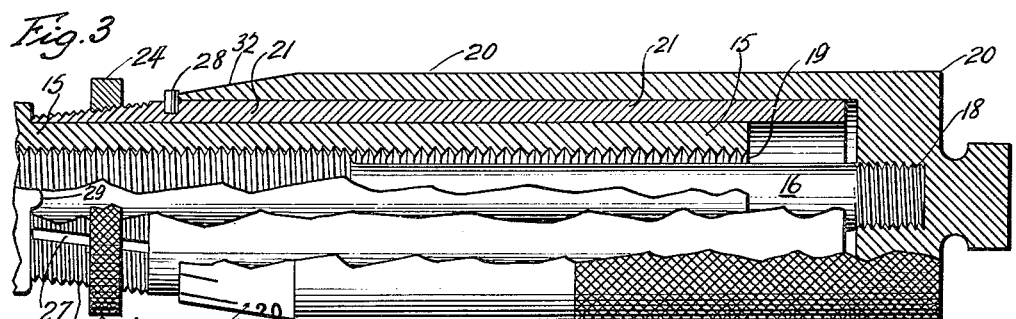
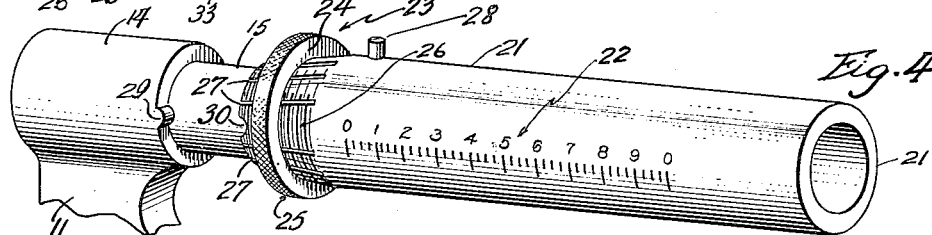
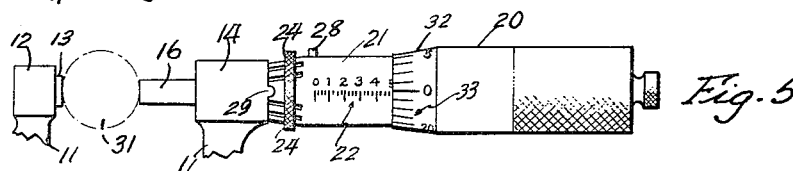
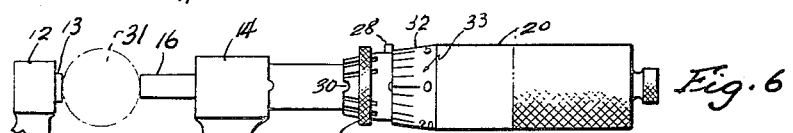
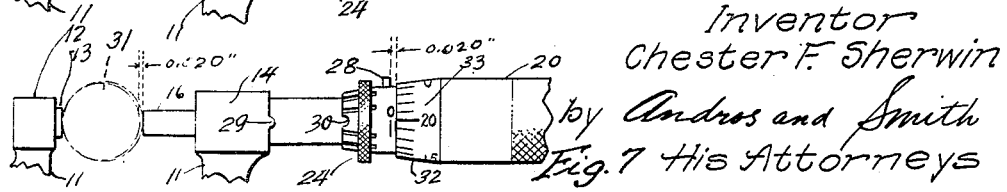
Inventor
Chester F. Sherwin
by Andrus and Smith
His Attorneys Patented Oct. 21, 1952

2,614,331

UNITED STATES PATENT OFFICE 2,614,331

MICROMETER

Chester F. Sherwin, Watervliet, N. Y.

Application July 24, 1951, Serial No. 238,314

7 Claims. (Cl. 33—164)

This invention relates to measuring instruments and, more particularly, to micrometer calipers, preferably adapted for external use, as well as internal use, having a slidable, graduated or scaled sleeve of novel construction and function, and the provision of such an instrument is a principal object of the invention.

Generally, it is an object of the invention to provide such an instrument which is simple yet sturdy and durable of construction, economic of manufacture, which will operate with relative freedom from wear and tear and other mechanical difficulties and, in particular, has many advantages such as, for example, the fact that constant addition and subtraction during use is substantially eliminated, speed of production is increased, errors can be eliminated by proper use, and the instrument of my invention also aids considerably in eliminating eyestrain, especially where older operators are concerned.

More specifically, it is an object of the invention to provide such an instrument having an open-ended frame with an anvil portion and a spindle portion, a spindle carrying sleeve having a spindle movably mounted therein, a slidable sleeve having a suitable longitudinally disposed scale thereon, mounted on the spindle carrying sleeve, and a thimble, having a peripherally disposed regular scale, connected to the spindle and rotatably mounted on the slidable sleeve and adapted to move longitudinally thereof in order that both scales cooperatively can be arranged to indicate measurement.

More specific objects of the invention are to provide such instruments in which the slidable sleeve has suitable means thereon to lock the same in any predetermined position along the spindle carrying sleeve; in which the exposed end of the slidable sleeve has a tapered portion which is longitudinally slotted to adapt the sleeve to be compressed in locked position by the locking means against the spindle; in which the exposed end of the spindle sleeve has a threaded portion with longitudinally arranged slots to adapt the same to be compressed in locked position against the spindle sleeve, the locking means being composed of a lock nut mounting the threaded portion of the sildable sleeve; in which the slidable sleeve has a stop element thereon, located at a point lying along the line circumferentially defining the beginning of the scale on the slidable sleeve, and adapted to abut the edge of the thimble when the latter has been set at a predetermined point; and in which the slidable sleeve and the spindle holding portion have relatively engageable means, for example, a lug and notch arrangement, for locating the slidable sleeve in proper position, prior to setting the thimble, whereby subsequently to cooperatively associate the thimble and the slidable sleeve.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understandng of the nature and objects of the invention reference should be had to the following detailed description taken in connection with the accompanying drawing, in which:

Fig. 1 is an elevational view, with a portion broken away, illustrating a preferred embodiment of the invention;

Fig. 2 is a detail view of a spindle;

Fig. 3 is a somewhat enlarged view, partly in section and with parts broken away, of a gripping portion of the instrument shown in Fig. 1 and illustrating the relative assembly of parts embodying the invention;

Fig. 4 is a perspective view illustrating the chief feature of the invention, namely, the slidable sleeve with locking means and other elements, mounted on the spindle carrying sleeve projecting from the spindle portion of such an instrument; and Figs. 5, 6 and 7 illustrate the pertinent portions of such an instrument depicted above demonstrating the various steps for setting and utilizing the device during operation.

Referring more particularly to the drawing, there is generally indicated at 10 in Fig. 1 a micrometer caliper of the external measuring type. This comprises an open-ended frame 11 terminating in an anvil portion 12 and having an anvil 13 at one end, and terminating at its other end in a spindle portion 14.

A spindle carrying sleeve 15 projects from the spindle carrying portion 14 as is customary in conventional instruments of this type. However, such sleeves are provided with a suitable longitudinally arranged scale of the vernier type, but in my invention as illustrated in the drawing no such graduation or scale is needed or utilized on the spindle carrying sleeve 15. Mounted within the spindle carrying sleeve is a spindle 16 having an intermediate threaded portion 17 and a threaded portion 18 at one end opposite the measuring end. The spindle carrying sleeve is internally threaded as at 19 and adapted to receive the threaded portion 17 of the spindle, which spindle is tightly secured to the thimble 20 by means of the threaded portion 18 which is located in the head of the thimble which is internally threaded to receive the same.

Now, referring in particular to Fig. 4, there are shown the novel structures constituting my invention. These comprise a slidable sleeve 21, having suitable graduations longitudinally arranged thereon as a vernier scale indicated generally at 22. This slidable sleeve is mounted on the spindle carrying sleeve 15. At the inner or exposed free end of the slidable sleeve there is provided locking means indicated generally at 23. The preferred arrangement of such means comprises an internally threaded locking ring, or nut 24, which is suitably knurled around its periphery as at 25. Preferably, the free end of the sliding sleeve 21, on which the locking means is mounted, is tapered and threaded as at 26 and this tapered portion is provided with one or more longitudinally arranged slots 27 in order that the slidable sleeve 21 can be compressed and locked in any predetermined or selected position against the spindle carrying sleeve 15.

A stop element 28 is provided on the slidable sleeve 21. This element preferably is located at a point lying along a line circumferentially defining the beginning of the scale on the slidable sleeve and is adapted to abut the edge of the thimble when the latter has been set at a predetermined point as will more fully appear hereinafter.

Preferably, there is also provided cooperatively engageable locating means for the slidable sleeve and these may take the form of a lug 29 on the spindle carrying portion and a notch 30 on the free end of the tapered portion of the sleeve as at 30. This lug and notch arrangement is utilized for locating the slidable sleeve in proper position, prior to setting the thimble in order subsequently to associate the thimble and the slidable sleeve also as will more fully appear hereinafter.

In operation, assume that a piece of stock such as, for example, a shaft indicated in dotted lines as at 31 measures somewhat in excess of ½", i. e., 0.520", and it is desired to turn down or grind such shaft exactly to ½", i. e. 0.500", the thimble 20, and consequently the spindle 16, is backed up as illustrated in Fig. 5 until the shaft 31 to be turned down or ground is measured therebetween. It will be observed that the lugs 30 and 27 are still cooperatively associated together so that the scale 32 is in proper position. The locking ring, or nut 24, is then loosened and the slidable sleeve 21 is moved along the spindle carrying sleeve 15 longitudinally thereof until the stop element 28 abuts the end of the thimble as shown in Fig. 6. It will be observed that the thimble which is of the conventional type, is also provided around its tapered portion 32 with a circular scale indicated at 33. When the slidable sleeve 21 has been moved along the sleeve 15, the zero mark thereon should be made to correspond with the zero mark on the scale 33, the latter scale being divided into 25 parts. The locking ring 24 is then tightened so that the slidable sleeve is secured in position against the spindle carrying sleeve 15 and the instrument will be set at ½", i. e. 0.500". In other words, the distance between the anvil and the measuring end of the spindle will be spaced apart that distance which is the ultimate size to which the shaft 31 is to be turned or ground down. By backing up the thimble and actually measuring the shaft, it will be seen that the reading will be at "20" as in Fig. 7 showing that the work piece 31 is 0.020 thousandth oversize. As the turning or grinding proceeds the piece can, from time to time, be measured or "miked" and the thimble advanced in order to determine how much stock is being removed. When the thimble again approaches or abuts the stop 28, it cannot be moved any further and the ultimate size, that is, 0.500" will have been reached.

It will thus be seen that the objects hereinbefore set forth may readily and efficiently be attained, and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features on the invention herein described, and all statements of the scope of the invention which, as a matter of language, might be said to fall therebetween.

Having described my invention what I claim as new and desire to secure by Letters Patent is:

1. In a micrometer caliper, the combination comprising an open-ended frame having an anvil portion and a spindle portion; a spindle carrying sleeve projecting from said spindle portion and having a spindle movably mounted therein; a slidable sleeve, having a vernier scale thereon, mounted on said spindle carrying sleeve; and a thimble, having a peripherally disposed regular scale, connected to said spindle and rotatably mounted on said slidable sleeve, and adapted to move longitudinally thereof, whereby said scales cooperatively can be associated to indicate measurement.

2. In a micrometer caliper, the combination comprising an open-ended frame having an anvil portion and a spindle portion; a spindle carrying sleeve projecting from said spindle portion and having a spindle movably mounted therein; a slidable sleeve, having a vernier scale theron, mounted on said spindle carrying sleeve, said slidable sleeve having locking means thereon to lock the same in any predetermined position along said spindle carrying sleeve.

3. In a micrometer as set forth in claim 2 and further characterized in that the exposed end of said slidable sleeve constitutes a tapered portion, and said tapered portion being longitudinally slotted to adapt the same to be compressed in locked position by said locking means against said spindle sleeve means.

4. In a micrometer as set forth in claim 2, and further characterized in that the exposed end of said slidable sleeve constitutes a threaded portion, said threaded portion being longitudinally slotted to adapt the same to be compressed in locked position aginst said spindle sleeve, and said locking means consisting of a lock nut mounting said threaded, slotted portion of the slidable sleeve.

5. In a micrometer as set forth in claim 2, and further characterized in that said slidable sleeve has a stop element thereon located at a point lying along a line circumferentially defining the beginning of the scale on said slidable sleeve, and adapted to abut the edge of a thimble when the latter has been set at a predetermined point.

6. In a micrometer caliper, the combination comprising an open-ended frame having an anvil portion and a spindle portion; a spindle carrying sleeve projecting from said spindle portion and having a spindle movably mounted therein; a slidable sleeve, having a vernier scale thereon, mounted on said spindle carrying sleeve, said slidable sleeve having means thereon to lock the same in any predetermined position along said spindle carrying sleeve, said slidable sleeve and said spindle holding portion having cooperatively engageable means thereon for locating said slidable sleeve in proper position, prior to setting said thimble, whereby subsequently cooperatively to associate said thimble and said slidable sleeve.

7. In a micrometer as set forth in claim 6, and further characterized in that said cooperatively engageable means comprises a lug on said spindle holding means and a notch on said slidable sleeve adapted to receive said lug.

CHESTER F. SHERWIN.

No references cited.